(12) United States Patent
Chueh et al.

(10) Patent No.: US 7,249,739 B2
(45) Date of Patent: Jul. 31, 2007

(54) DISPLAY STAND

(75) Inventors: Chien-Tsai Chueh, Chu-Nan (TW); Min Hao Yuan, Chu-Nan (TW)

(73) Assignee: Coretronic Corporation, Chu-Nan, Miao-Li County (TW)

( * ) Notice: Subject to any disclaimer, the term of this patent is extended or adjusted under 35 U.S.C. 154(b) by 485 days.

(21) Appl. No.: 10/971,137

(22) Filed: Oct. 25, 2004

(65) Prior Publication Data

US 2005/0109893 A1    May 26, 2005

(30) Foreign Application Priority Data

Nov. 3, 2003    (TW)    .............................. 92131005 A (51) Int. Cl.
  *A47F 5/12*    (2006.01)
(52) U.S. Cl. ...................... 248/133; 248/125.2; 40/748
(58) Field of Classification Search ................ 248/917, 248/918, 919, 920, 923, 922, 921, 122.1, 248/125.1, 125.2, 125.3, 121, 371, 407, 423, 248/422, 408, 412, 133; 40/748, 749, 755
See application file for complete search history.

(56) References Cited

U.S. PATENT DOCUMENTS

| | | | | |
|---|---|---|---|---|
| 5,366,197 A | * | 11/1994 | Westland | 248/456 |
| 5,765,797 A | * | 6/1998 | Greene et al. | 248/398 |
| 5,831,696 A | * | 11/1998 | Sheng | 349/58 |
| 5,833,183 A | * | 11/1998 | Chang | 248/176.1 |
| 5,915,658 A | * | 6/1999 | Sheng | 248/346.06 |
| 6,353,529 B1 | * | 3/2002 | Cies | 361/681 |
| 6,402,109 B1 | * | 6/2002 | Dittmer | 248/284.1 |
| 6,504,707 B2 | * | 1/2003 | Agata et al. | 361/681 |
| 6,554,242 B2 | * | 4/2003 | Kim | 248/371 |
| 6,604,722 B1 | * | 8/2003 | Tan | 248/276.1 |
| 6,766,994 B2 | * | 7/2004 | Serbinski et al. | 248/371 |
| 6,822,857 B2 | * | 11/2004 | Jung et al. | 361/681 |
| 2002/0033436 A1 | * | 3/2002 | Peng et al. | 248/284.1 |
| 2004/0084588 A1 | * | 5/2004 | Liu et al. | 248/291.1 |
| 2004/0113031 A1 | * | 6/2004 | Sung | 248/146 |
| 2004/0118987 A1 | * | 6/2004 | Matko et al. | 248/282.1 |
| 2005/0035252 A1 | * | 2/2005 | Chen | 248/284.1 |

* cited by examiner

*Primary Examiner*—A. Joseph Wujciak, III
(74) *Attorney, Agent, or Firm*—Bacon & Thomas, PLLC (57) ABSTRACT

A display stand comprises a connecting seat and supporting plate. A vertical guiding slot is disposed on said connecting seat. A rack and a control section are installed respectively at the two flank sides of the vertical guiding slot, in which the control section has a locking bar accepted in the slider, and one end thereof is engaged with the rack. After a panel is combined with connecting seat, said locking bar is driven to move along a single direction to be separated from the engagement of said rack by pulling the pull rod of the control section to push a skewed slot, and the slider is caused to slide up and down along the sliding slot by pulling said pull rod so as to change a relative angle between the connecting seat and the supporting plate. Finally, the pull rod is released to complete a positioning.

9 Claims, 9 Drawing Sheets

DISPLAY STAND

BACKGROUND OF THE INVENTION

1. Field of the Invention

The present invention relates to a display stand, and more particularly to an angle adjustable display stand.

2. Description of Related Art

LCD (Liquid Crystal Device) is broadly used as a computer screen or television. With the technology development, LCD having originally a display function is developed to a device having touch control and handwriting functions. This allows an user to select a function directly on a display or input by handwriting.

Figure 1A:
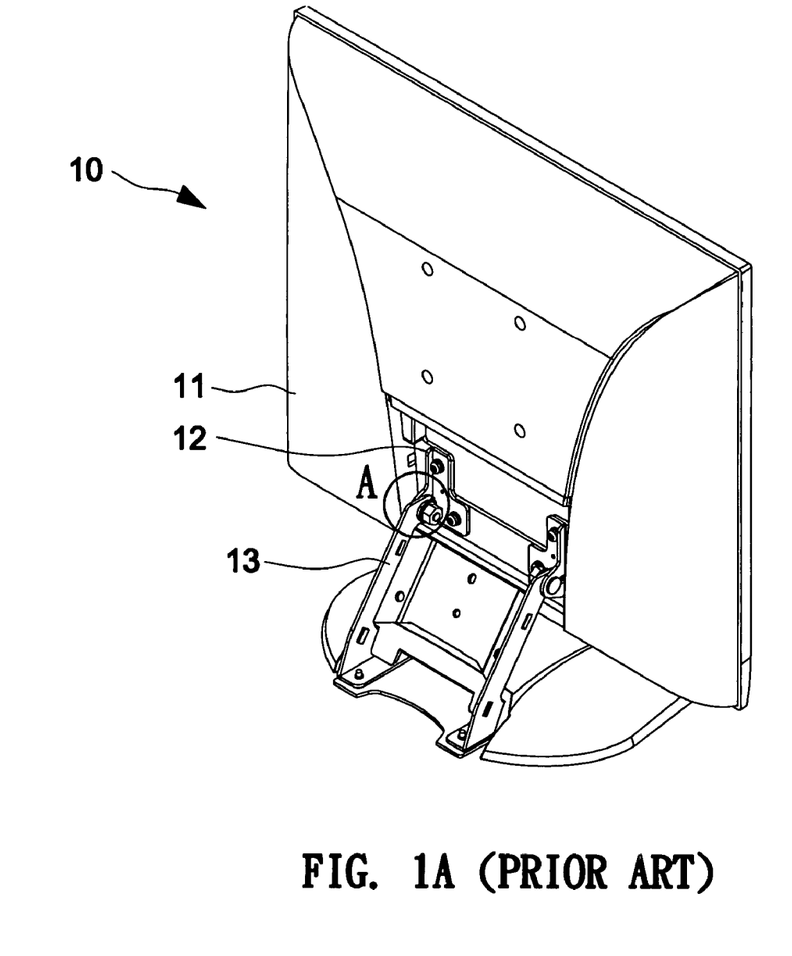
FIG. 1A is a perspective view, showing a liquid crystal display device of the prior art.
Figure 1B:
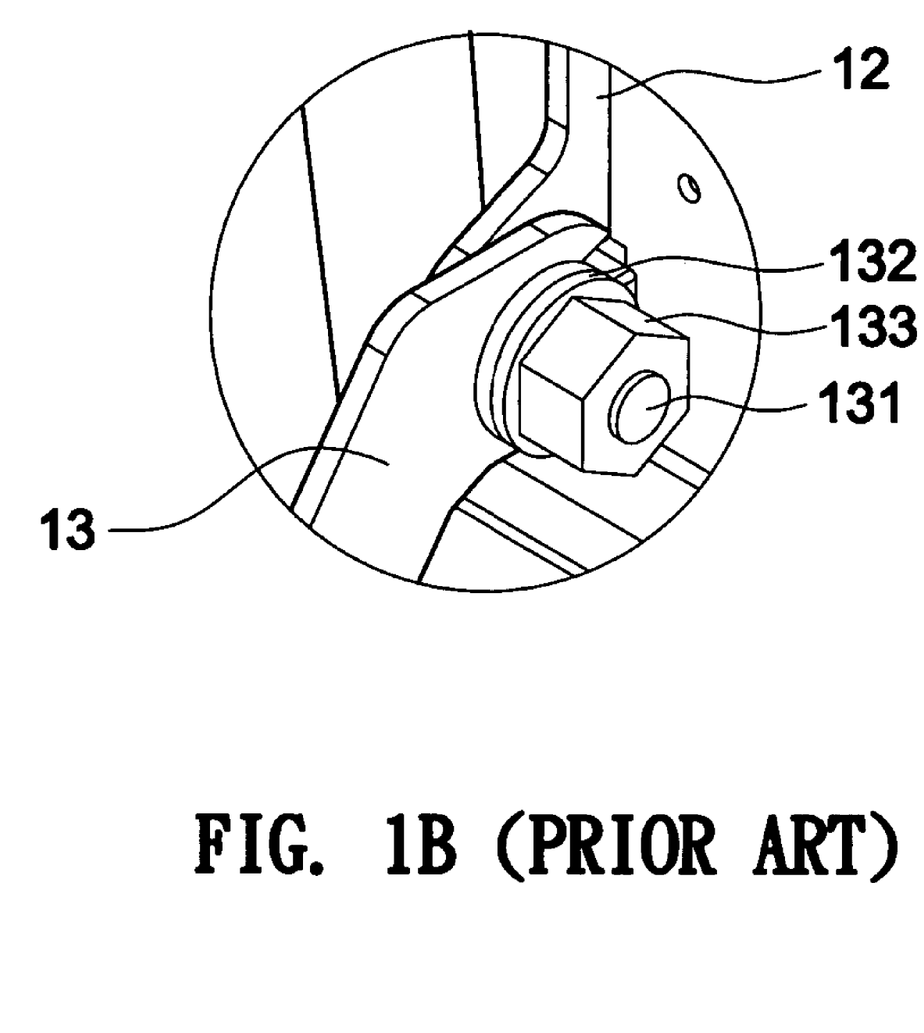
FIG. 1B is an amplified view, showing part A in FIG. 1A.

Please refer to FIG. 1A and FIG. 1B. A display panel 11 is installed on a connecting seat 12 of a conventional LCD 10, and then a pivoting shaft 131 engaged with several round washers 132 is used to lock the panel 11 through nuts 133 so as to allow the two ends of the connecting seat 12 to connect pivotally with a supporting plate 13. The rebounding force yielded from the washers 133 allows compelling the supporting plate 13 and the connecting seat 12 tightly owing to the tight compressing on the washers 132 by the nuts 133. The connecting seat 12 is positioned to an adjusted angle by turning the panel 11 when the panel is needed to adjust the angle thereof. However, the angle of the panel 11 is not easy to be maintained, because the pivoting shaft 131 is worn away after using for a long time, resulting the insufficient compelling force. Furthermore, such structure is easy to be turned an angle when an external force is acted thereon so that the conventional structure cannot bear a pressure acted by an user's elbow and meanwhile maintains the angle thereof unchanged when an operation (such as handwriting or touch control) that needs to press on the panel 11 is practiced.

Therefore, for solving the problem of insufficient positioning ability and insufficient ability to bear the weight of the conventional display stand mentioned above, a display stand applied on a panel used for an operation with handwriting or touch control needs to be improved.

SUMMARY OF THE INVENTION

One object of the present invention is to provide an angle adjustable display stand, using a pull rod at a fixed position to control a sliding locking bar to move along a single direction to be separated from a rack so as to practice a fast and convenient operation.

Another object of the present invention is to provide an angle adjustable display stand, using the co-operation of the sliding of a slider to adjust an angle to make a broad angle adjustment so as to provide a proper angle for handwriting and viewing.

Still another object of the present invention is to provide an angle adjustable display stand, providing a supporting plate with a sufficient positioning capability to bear the weight acted upon by an user so as not to be loosened, by engaging a rack and a locking bar to each other to position and stop the locking bar from being separated along a direction by the blocking from a skewed slot resulting from its direction.

For attaining the objects mentioned above, a connecting seat and one end of a supporting plate are pivotally connected to a base in an angle adjustable display stand according to the present invention. And then, a vertical slot is disposed on the connecting seat and is operated in coordination with a slider installed movably on the supporting plate. A rack and a control section are respectively disposed on the two flank sides of the vertical slot. A locking bar disposed in the control section is accepted in the slider and one end thereof is engaged with the rack. A pull rod of the control section is pulled to move a skewed slot so as to drive the locking bar to move along a single direction to be separated from the rack after the panel and the connecting seat are combined together. And then, the slider is made to slide up and down along a slide slot so as to change a relative angle between the connecting seat and the supporting plate. Finally, a positioning is completed after the pulling rod is released. Whereby, the present invention can provide a display stand with convenient operation and fast angle adjustment. Besides, a rack and locking bar are locked to each other to position a display stand so as to provide a display stand enough positioning capability.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 2:
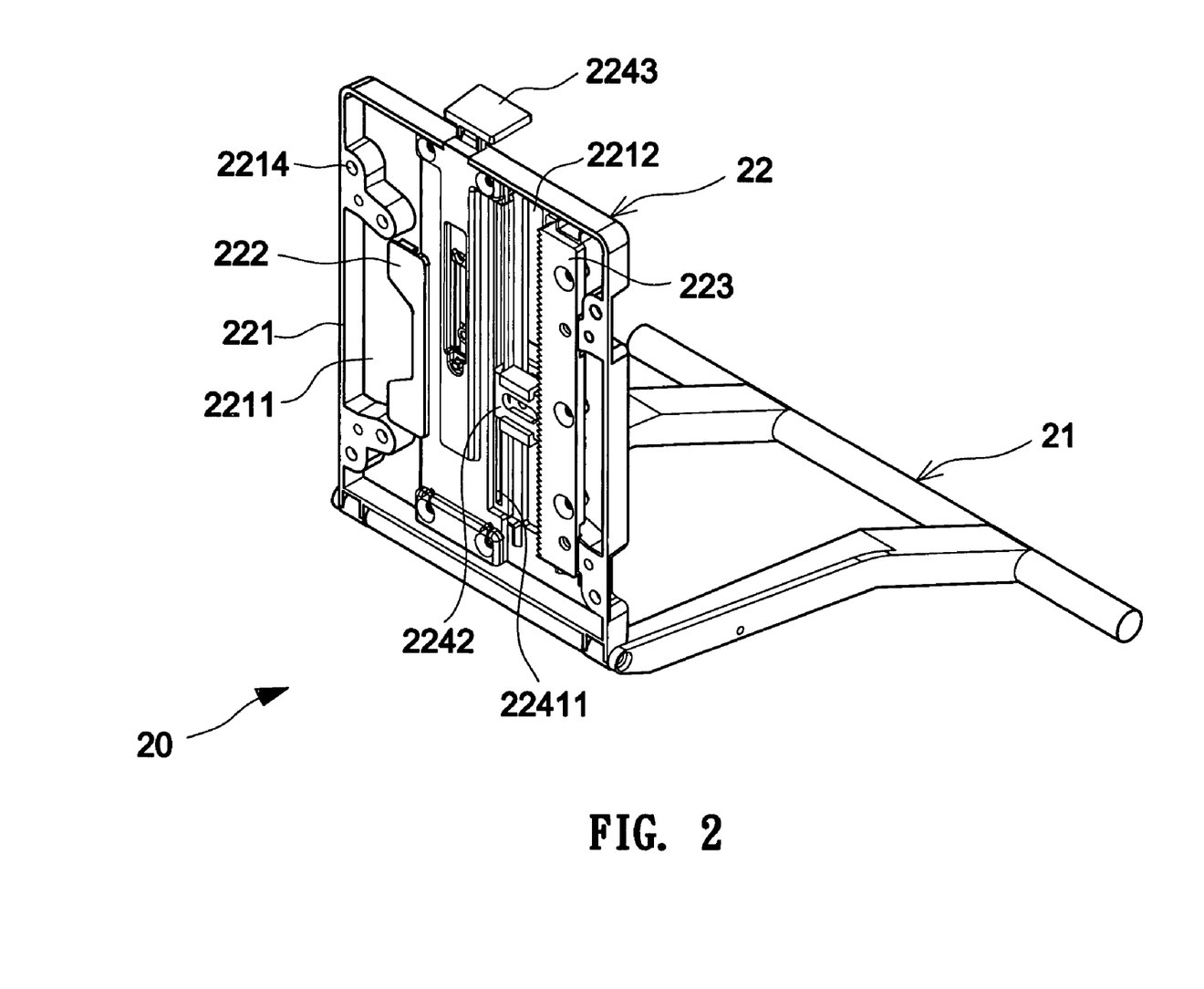
FIG. 2 is a perspective view, showing an assembly of an angle adjustable display stand according to the present invention.
Figure 3:
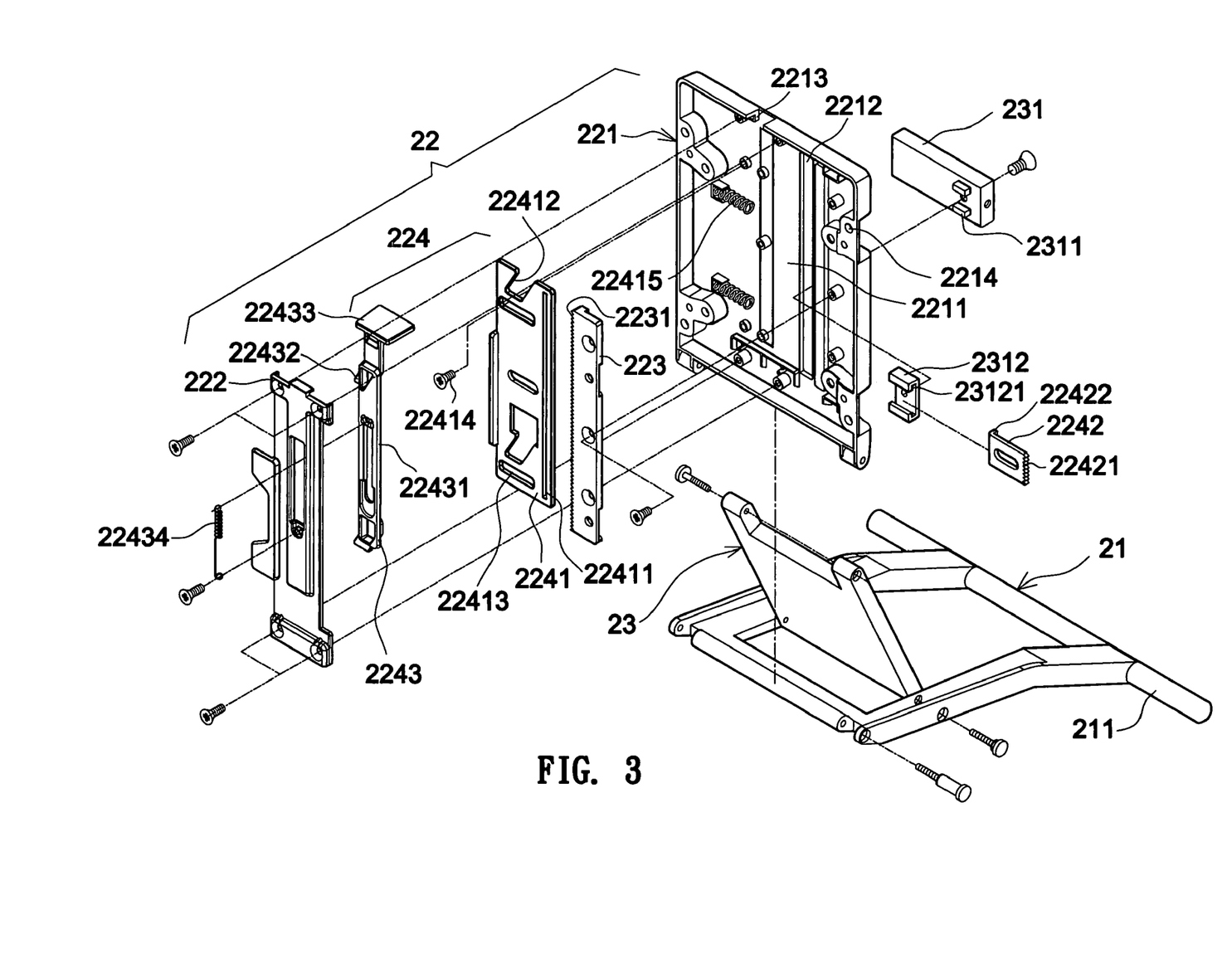
FIG. 3 is an exploded view, showing an angle adjustable display stand according to the present invention.

Please refer to FIGS. 2 and 3. An angle adjustable display stand 20 comprises a base 21, connecting seat 22 and supporting plate 23, in which two level legs 211 are extended respectively to two flank sides at the rear end of the base 21; one end of the connecting seat 22 is pivotally connected to the front end of the base 21. The connecting seat 22 comprises a seat body 221 and a covering plate 222 installed at the top of the seat body 221. An accepting groove 2211 whose rim is disposed with raised connecting holes 2214 is for connecting with every kind of panel. A vertical slide slot 2212 whose two flank sides are respectively installed with a rack 223 and a control section 224 that are operated in coordination with each other is opened at the bottom of the accepting groove 2211. A plurality of engaging teeth is disposed at one side of the rack 223 facing the slide slot 2212.

The control section 224 comprises a sliding plate 2241, a locking bar 2242 and a pull rod 2243. A vertical slide slot 22411 is opened at one side of the sliding plate 2241 and return elements 22415 are disposed outside of a wall face of another side thereof. The elastic deformation direction of the return elements is parallel to the moving direction of the sliding plate 2241. One end of each return element 22415 is fixed on the seat body 221 and another end thereof is pressed against the sliding plate 2241; the return element 22415 can be a spring, an elastic sheet or something else. Skewed slots 22412 are disposed respectively at the top end and at a location close to the bottom end of the sliding plate 2241; each skewed slot 2412 is inclined to another side of the rack 223 by a smaller angle. Level guiding slots 22413 are further disposed at proper locations of the sliding plate 224 and a guiding element 22414 fixed at the bottom of the accepting groove 2211 is installed in each level guiding slot 22413. A locking bar 2242 is installed between the rack 223 and the sliding plate 2241; a teeth portion 22421 and curved portion 22422 are respectively disposed at two ends thereof. The teeth portion 22421 is engaged with the teeth 2231 of the rack 223 and the curve portion 22422 is hooked in the vertical guiding slot 22411 of the sliding plate 2241. The pull rod 2243 is installed on the sliding plate 2241; the pull rod 2243 consists of a plate body 22431 and at least one driving element 22432 is fixed on the plate body 22431. The number and the locations of the driving elements 22432 are determined according to the number and the locations of the skewed slots 22412. An inclined portion used to operate in coordination with the skewed slot 22412 is disposed at the bottom end of the driving element 22432 and the inclined portion is accepted in the skewed slot 22412. A grip 22433 that is projected out of the top end of the seat body 221 for an user to handle the pull rod 2243 conveniently, is disposed perpendicularly at the top end of the plate body 22431. Guiding sheets 2213 are installed on the rim of the pull rod 2243 to guide the pull rod 2243 to move along a single direction (i.e. the direction perpendicular to the guiding slot 22411). A return element 22434 is installed on the plate body 22431; one end of the return element 22434 is fixed on the pull rod 2243 and another end thereof is fixed on the covering plate 222. The elastic deformation direction of the return element 22434 is parallel to the moving direction of the pull rod 2243.

The supporting plate 23 positioned behind the connecting seat 22 is used to support the connecting seat 22 in order to form an angle between the connecting seat 22 and the base 21; the bottom end thereof is pivotally connected onto the base 21 and the top end thereof is pivotally installed with a slider 231. Protruding studs 2311 are disposed on the slider 231 corresponding to the vertical guiding slot 22411; the protruding studs 2311 are placed in the guiding slot 22411 to guide the slider 231 to move along the guiding slot 22411. A "⊏" type seat 2312 with a level sliding groove 23121 is further fixed on the protruding studs, and the locking bar 2242 is accepted in the level sliding groove 23121 of the "⊏" type seat 2312; the locking bar 2242 can be moved along a horizontal direction relative to the slider 231. Therefore, an angle adjustable display stand according to the present invention 20 can be assembled through the elements mentioned above (as FIG. 2 shows).

Figure 4:
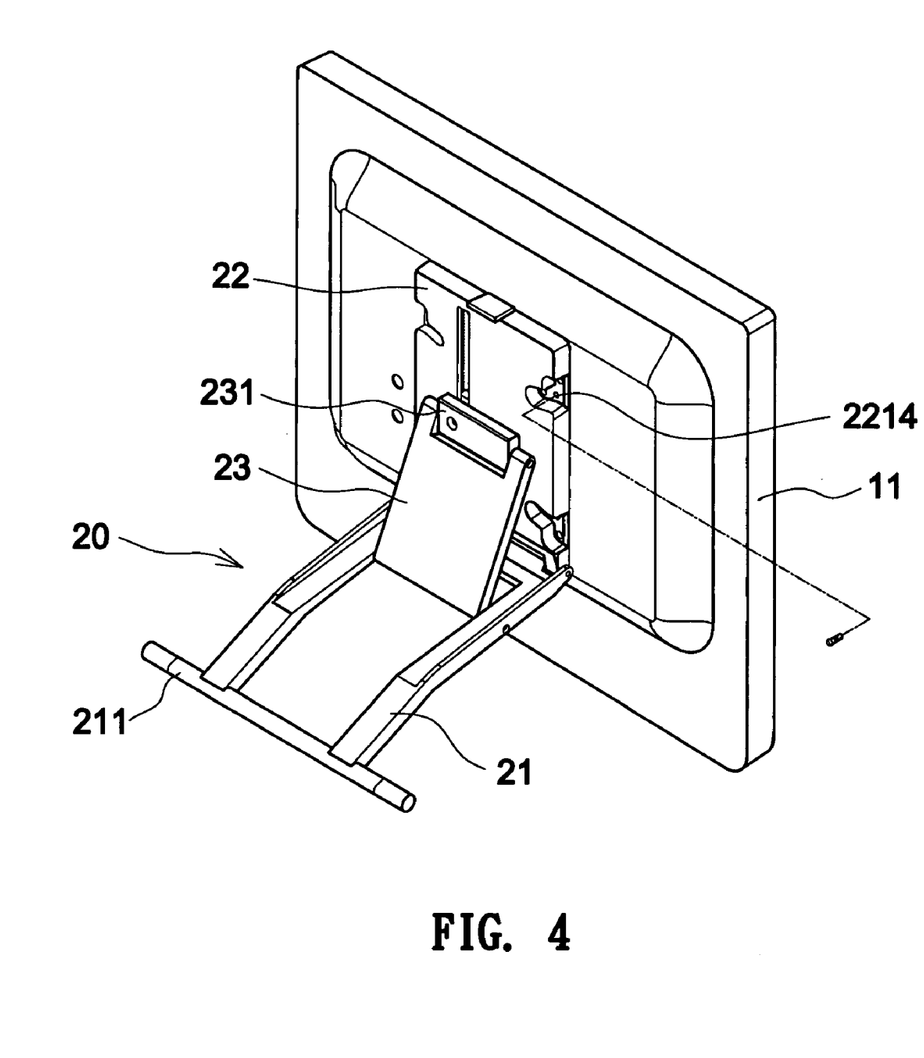
FIG. 4 is a perspective view, showing an combination of an angle adjustable display stand and a panel.
Figure 5A:
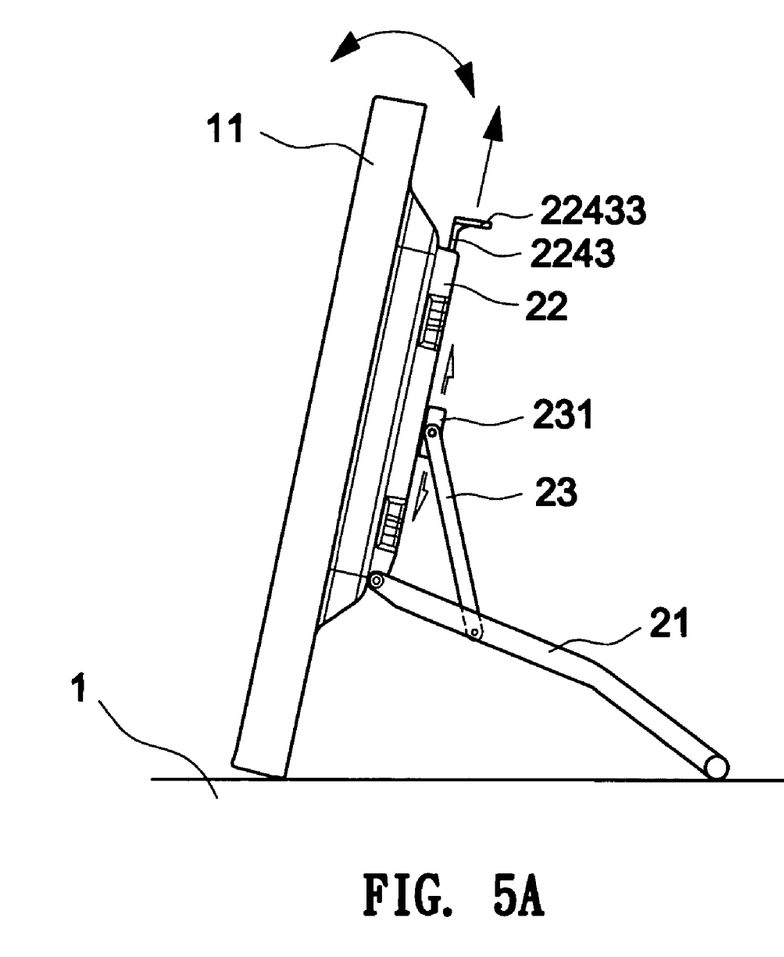
FIGS. 5A and 5B are side views, showing action states of an angle adjustable display stand according to the present invention.
Figure 5B:
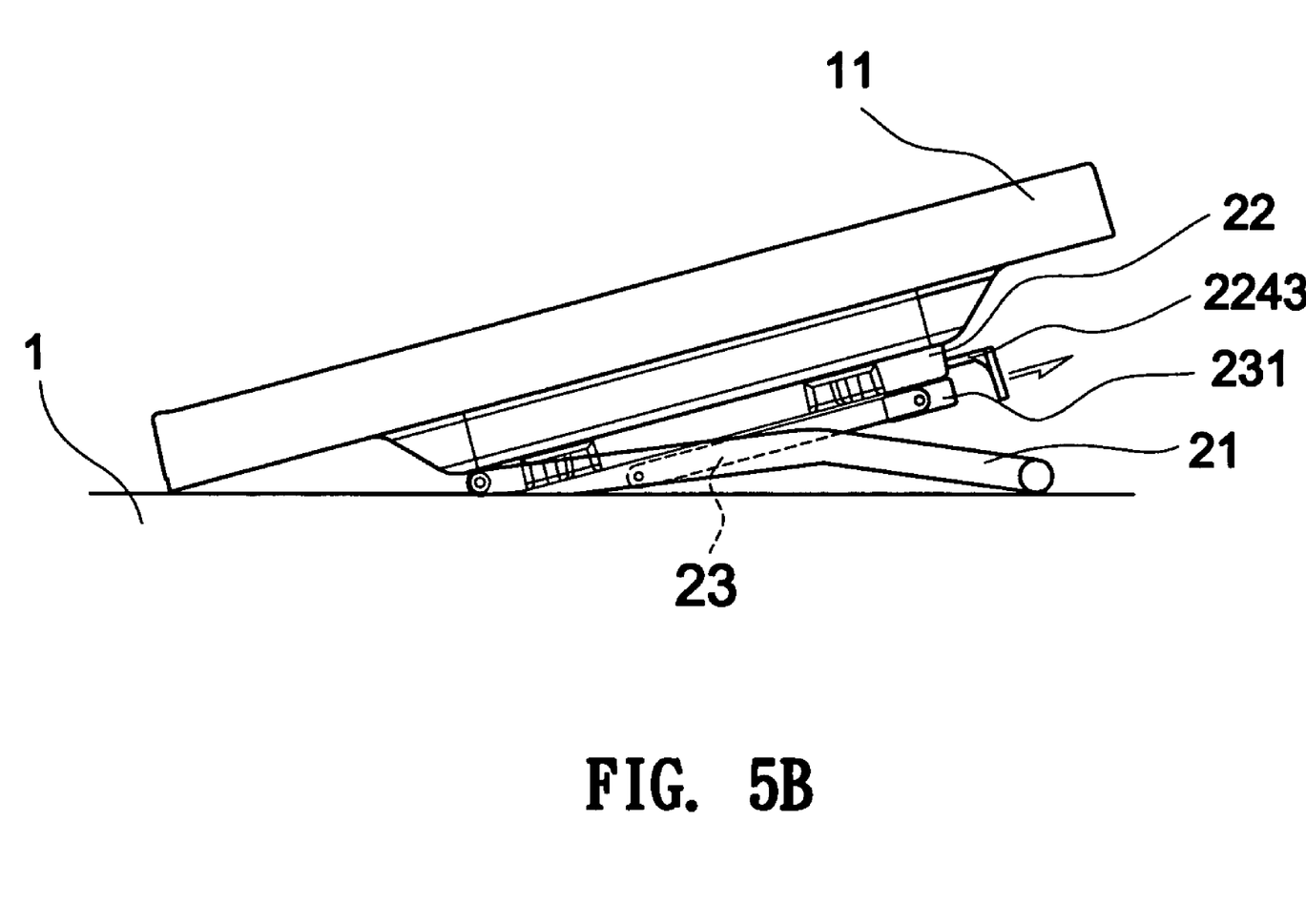
Figure 6A:
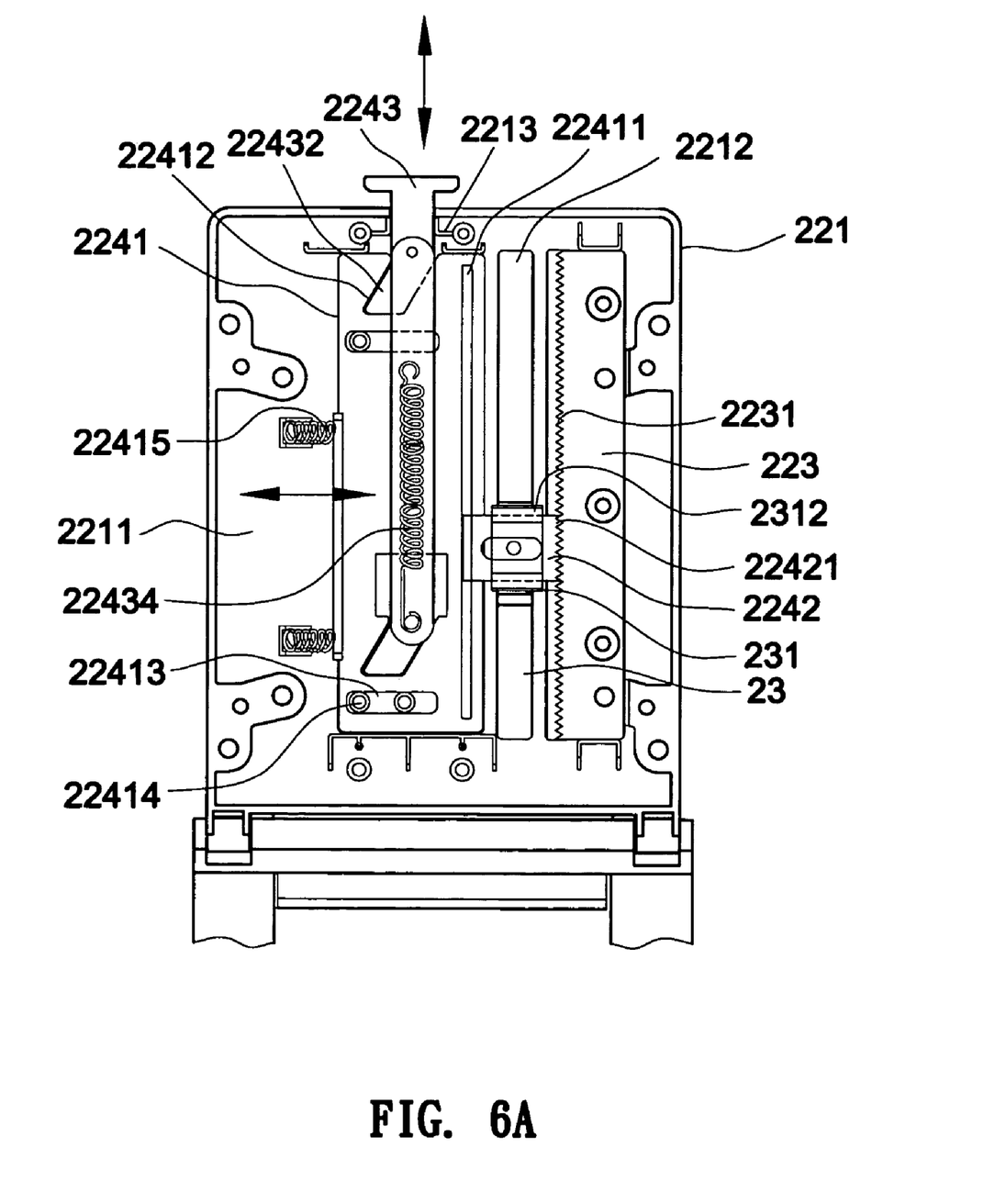
FIGS. 6A and 6B are frontal views, showing action states of an angle adjustable display stand according to the present invention.
Figure 6B:
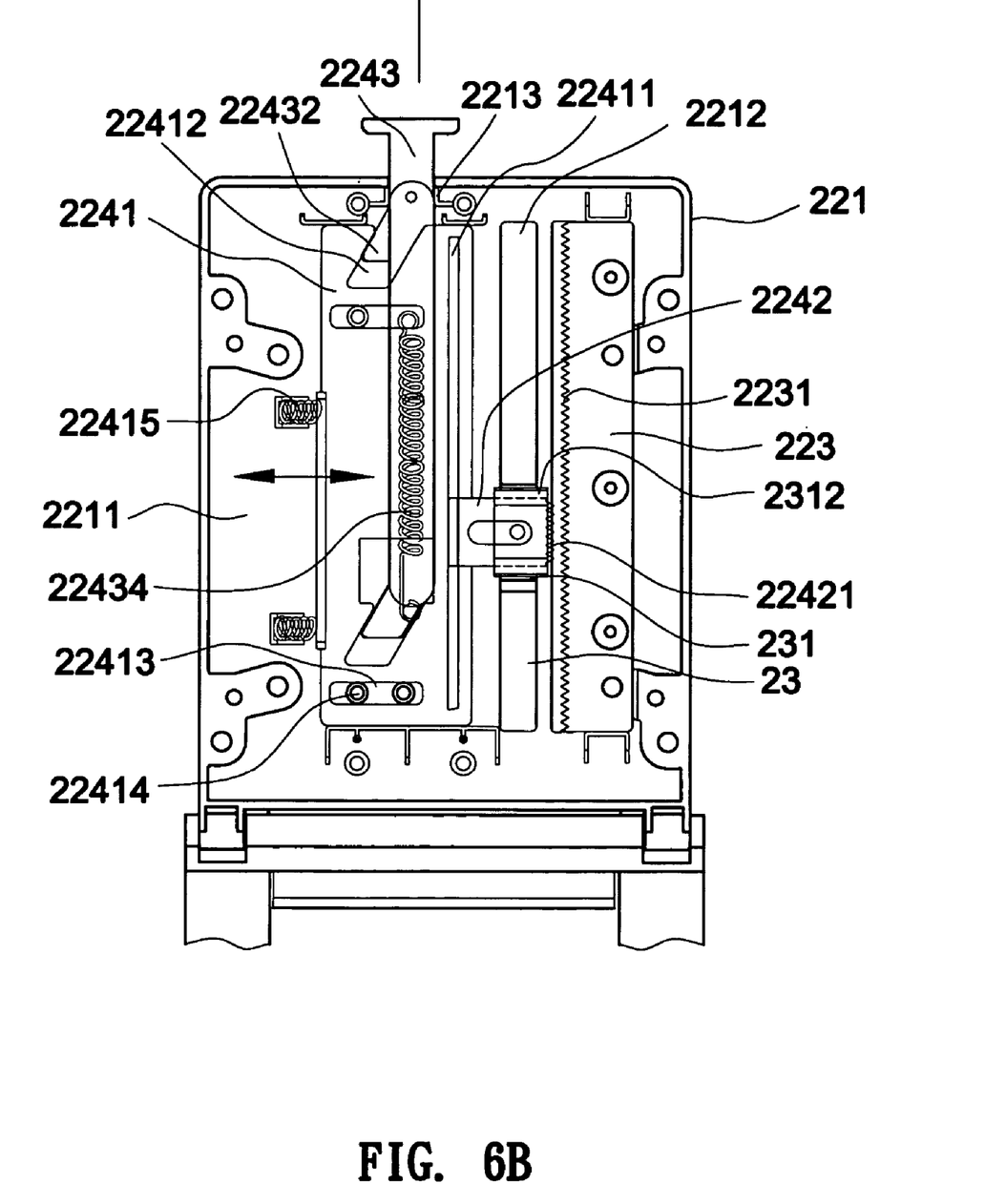

Please refer to FIGS. 4, 5A and 6A. The level feet 211 of the base 21 and the bottom of a display panel 11 are supported on a table 1, after the display panel 11 is screwed in the connecting holes 2214. Meanwhile, the teeth portion 22421 of the locking bar 2242 is engaged with the engaging teeth 2231 of the rack 223 to form a fixed state. Please refer to FIGS. 5B and 6B. When the pull rod 2243 is pulled upward to move, the return element 22434 is extended and deformed, the driving element 22432 of the pull rod 2243 is pressed against the inclined face of the skewed slot 22412, and then the sliding plate 2241 is forced to move along a level direction through the guidance of the matching-up of the guiding element 22414 and the level guiding slot 22413. Meanwhile, the locking bar 2242 hooked in the vertical guiding slot 22411 of the sliding plate 2241 is driven to be separated from the engagement of 223 levelly. At this time, the connecting seat 22 is further pulled through the pull rod 2243 to cause the slider 231 to slide up and down along the sliding slot 2212 so as to change the relative angle between the connecting seat 22 and the supporting plate 23 to reach a predetermined position, and then the pull rod 2243 can be released. In the meantime, the pull rod 2243 is acted with an elastic force from the return element 22434 to spring back to its original position (as FIG. 6A shows) to cause the locking bar 2242 to engage with the rack 223 so as to fix the connecting seat 22. Therefore, the pull rod 2243 for fixing position is used to control an engagement state and the slider 231 is operated in coordination to slide and adjust an angle so that an user can find the pull rod 2243 easily to operate and adjust the angle quickly. Also, the relative angle between the connecting seat 22 and the supporting plate 23 can be changed by engaging the locking bar 2242 with the supporting plate 23 at a different position so as to allow the panel 11 to have a broad range of different inclined angles to provide a view use or a handwriting use of a panel.

Engaging the teeth portion 22421 of the locking bar 2242 and the engaging teeth 2231 of the rack 223 to position each other is used to fix the display stand 20 and meanwhile the moving directions of the skewed slot 22412 and the locking bar 2242 are formed a big angle, and the elastic force of the return element 22434 is operated in coordination, the engagement of the teeth portion 22421 of the locking bar 2242 and the rack 223 is stably supported to provide the display stand 20 a sufficient positioning force so that the display stand 20 can bear the weight acted by an user and not be loosened when the user imposes a pressure on the panel 11 while processing handwriting or touch control operation. Besides, the return elements 22415 can also be installed at the flank side of the sliding plate 2241 to enhance supporting.

Furthermore, owing to the installments of the skewed slot 22412 of the control section 224, the vertical sliding slot 22411 and the level guiding slot 22413, the locking bar 2242 is allowed to move along a single direction so as to cause the teeth portion 22421 of the locking bar 2242 to be separated levelly from the engagement of the engaging teeth 2231 of the rack 223. Therefore, the locking bar 2242 can be separated from the engagement smoothly.

It is noted that the display stand described above is the preferred embodiment of the present invention for the purpose of illustration only, but is not intended as a definition of the limits and scope of the invention disclosed. Any modifications and variations that may be apparent to a person skilled in the art are intended to be included within the scope of the present invention.

What is claimed is:

1. A display stand, comprising:
   a base;
   a connecting seat, one end thereof being connected to the front end of said base, said connecting seat comprising a seat body, an accepting groove being disposed in said seat body, and a vertical sliding slot being opened at the bottom of said accepting groove, a rack and a control section being installed respectively at the two flank sides of said sliding slot, said control section having a locking bar operated in coordination with said rack, said control section being used to drive said locking bar to move along a single direction to be separated from said rack; and
   a supporting plate, being installed behind the connecting seat, and the bottom end thereof being pivotally connected onto said base, the upper end thereof being pivotally connected to a slider, at least one protruding stud being disposed on said slider, said protruding stud being accepted in said vertical sliding slot of said connecting seat, and a level sliding slot being disposed over said protruding stud of said slider for accepting said locking bar.

2. The display stand according to claim 1, wherein two level feet are respectively extended toward two sides of the rear end of said base.

3. The display stand according to claim 1, wherein a covering plate is installed at the top of said seat body.

4. The display stand according to claim 1, wherein at least one raised connecting hole is disposed at the rim of said accepting groove for connecting every kind of panel.

5. The display stand according to claim 1, wherein said control section further comprises a sliding plate, a pull rod and a return element, a vertical guiding slot being opened at one flank side of said sliding plate, one end of said locking bar being hooked in said vertical guiding slot, at least one skewed slot being disposed on said sliding plate, said pull rod being installed on said sliding plate, at least one driving element being fixed on said pull rod, and said driving element being respectively accepted in said skewed slot, one end of said return element being fixed at said pull rod and another end thereof being fixed on said connecting seat.

6. The display stand according to claim 5, wherein a broad angle is formed between the moving directions of said skewed slot and said locking bar.

7. The display stand according to claim 5, wherein at least one level guiding slot is disposed at a proper location in said sliding plate, and a guiding element fixed at the bottom of said accepting groove is installed in said level guiding slot.

8. The display stand according to claim 5, wherein a guiding plate is installed at the rim of said pull rod.

9. The display stand according to claim 5, wherein at least one return element is installed at one flank side of said sliding plate.

* * * * *